United States Patent
Pedigo

[15] 3,664,097
[45] May 23, 1972

[54] GRASS-CLIPPINGS PELLETIZER FOR LAWNMOWERS

[72] Inventor: Richard A. Pedigo, 2030 Champa St., Denver, Colo. 80205

[22] Filed: Dec. 17, 1970

[21] Appl. No.: 99,151

[52] U.S. Cl. ..................... 56/1, 56/16.4, 56/16.6, 56/202, 100/145, 100/DIG. 3
[51] Int. Cl. ........................................ A01d 43/00
[58] Field of Search ............ 56/1, 16.4, 16.6, 156, 157, 56/194–206; 100/149, DIG. 3, DIG. 9

[56] References Cited

UNITED STATES PATENTS

| | | |
|---|---|---|
| 2,162,564 | 6/1939 | Poliner.................. 100/145 X |
| 2,633,091 | 3/1953 | Wenger................. 100/DIG. 3 |
| 2,811,004 | 10/1957 | Borrow..................... 56/1 X |
| 3,222,853 | 12/1965 | Michael.................. 100/145 X |
| 3,229,320 | 1/1966 | Cymara.................. 56/202 X |
| 3,242,658 | 3/1966 | Morales................. 56/202 UX |

Primary Examiner—Robert Peshock
Assistant Examiner—J. A. Oliff
Attorney—Richard D. Law

[57] ABSTRACT

Attachment for power lawnmowers, driven by the lawnmower motor has a rotating shaft revolving fan blades and a screw auger within a hollow body. Grass clippings from the mower are sucked into an inlet in the body by the fan blades, compacted by the auger, and emitted through an apertured extrusion plate as dense pellets.

6 Claims, 6 Drawing Figures

Patented May 23, 1972  3,664,097
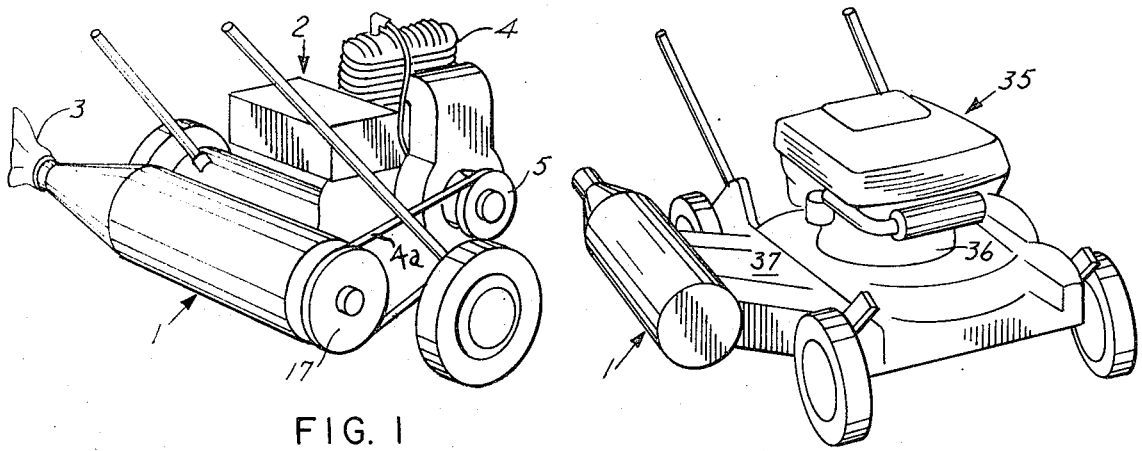
FIG. 1
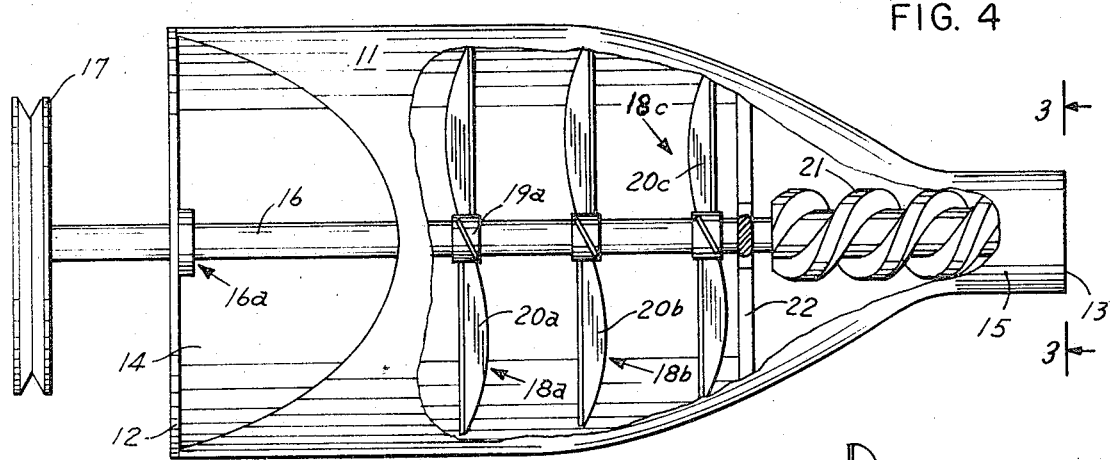
FIG. 4
FIG. 2
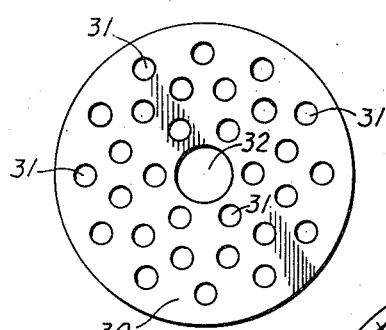
FIG. 3
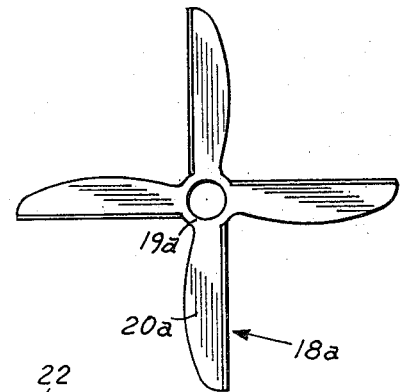
FIG. 5
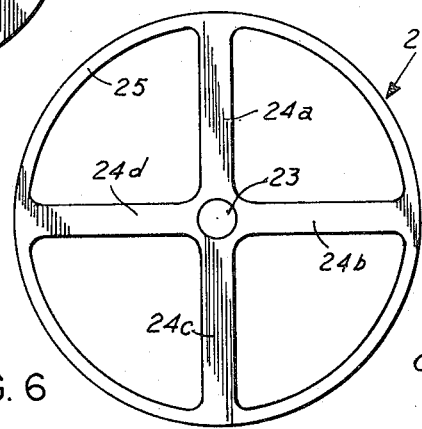
FIG. 6
INVENTOR
RICHARD A. PEDIGO
BY
Richard H. Law
ATTORNEY

GRASS-CLIPPINGS PELLETIZER FOR LAWNMOWERS

Most power lawnmowers are equipped with removable baskets to catch grass-clippings from the mower as a lawn is cut. Removal of such clippings from the lawn provides a neater appearing and more healthy lawn. Since the grass clippings only loosly settle in the lawnmower basket, the ungainly baskets must be frequently emptied and reconnected to the lawnmower. Many clippings fail to land in the basket; quite a few of the clippings which initially fall into the basket are either shaken out by vibration and motion of the mower or are blown out by wind or the mower exhaust. Often a lawn must be raked even after using a basket-equipped mower.

Disposal of such grass clippings also poses problems. In most areas, grass and leaves may no longer legally be burned. Even where burning is allowed, the grass clipping and leaves must be piled in exposed condition for a few days until they have become dry enough to burn. By the time the clippings are ready for burning, the neat pile of clippings and leaves is found to be dispersed across lawns and sidewalks. Wind, children, and dogs all seem to conspire to destroy grass piles. The result being that between cutting and burning many homeowners must rake their lawns not once, but twice. To circumvent such problems, many homeowners are now taking the cuttings from the mower basket and pouring them into large plastic bags which can be hauled to a nearby dump or picked up by trash collectors. Pouring the clippings from basket to bag is a task which, for most people, seems to require more than two hands. The typical result is that nearly as many clippings fall to the ground as fall into the bag. Finally, the ungainly basket must be reconnected to the mower; if not properly connected, the basket will shake loose from the mower and spill the clippings over the lawn.

According to the present invention there is provided an apparatus for attachment to lawnmowers which sucks grass clippings into a hollow body where they are compacted and extruded as dense pellets into an attached plastic bag. The apparatus is powered by the mower and remains attached thereto during normal operation. Since a large quantity of clippings is compacted into the dense pellets, an attached, disposable bag will serve for a relatively long period of time and there is no requirement for transfer of clipping from the attached bag to another bag.

An important object and advantage of the present invention is to provide an improved attachment for lawnmowers to collect mower-clipped grass.

Another object and advantage of the present invention is to provide a motor driven attachment for power lawnmowers to collect mower-clipped grass.

Yet another object and advantage of the present invention is to provide an induced-draft attachment for mowers to collect clippings.

A further object of the invention is to provide an attachment which will compact grass clippings and emit dense, extruded grass pellets.

A still further object of the invention is to provide an attachment which feeds dense extruded grass pellets automatically into an attached, disposable bag.

These and other objects and advantages of the present invention may be readily ascertained by referring to the following description and appended illustrations, in which:

FIG. 1 is a perspective view of the apparatus of the invention attached to a reel type lawnmower;

FIG. 2 is a side view, partially cut away, of the apparatus of the invention;

FIG. 3 is a section view taken along lines 3—3 of FIG. 2;

FIG. 4 is a perspective view showing the device of the invention attached to a rotary-type lawnmower;

FIG. 5 is a detail of a blower blade of the invention; and

FIG. 6 is another detail of a structural web for the invention.

In FIG. 1, the grass-clippings pelletizer apparatus according to the inventor, denoted in general by numeral 1, is attached to a reel-type lawnmower, denoted in general by numeral 2, to collect the grass clippings cut by the mower and feed them, in the form of dense pellets, into bag 3. Mower motor 4 is utilized to drive both the mower and the pelletizer attachment 1; a suitable belt and pulley arrangement such as 4a and 5 respectively may be used to effect the power takeoff. The pelletizer 1 may be bolted, screwed, etc., to the lawnmower chassis via rigid support bracket which is a conventional bracket of the type which is typically used to secure attachments to machines. Because many mowers, even those made by different manufacturers, have similar motor, pulley, and chassis arrangements, bracket 37 may be standardized to a limited number of configurations which will, in turn, fit most models of lawnmowers. Although the pelletizer is illustrated in conjunction with a reel-type mower, it may be adapted for use with a rotary-blade type mower as shown in FIG. 4 wherein pelletizer 1 is attached via bracket 37 to a reel type mower, indicated in general by numeral 35, having motor 36.

The embodiment of the invention shown in FIG. 2, includes hollow body 11 of generally circular cross-section tapering from larger enclosed end 12 to narrower discharge end 13 on neck 15, and having inlet opening 14. A number of materials are suitable to fabricate body 11; heavy gage sheet metal with welded seams is suggested. End 12 may be of a heavier gage metal than the remainder of the body. Inlet 14 is formed by cutting an arcuate portion from the body; an inlet opening approaching the body diameter in width and breadth is effective for the operation of the apparatus.

Shaft 16, rotatably supported at end 13 and end 12 respectively, extends through body 11 and a substantial distance beyond end 12 to belt pulley 17. Shaft 16 is a conventional hardened metal shaft of circular cross-section at ends 12 and 13; the shaft may be either of square or circular cross-section at the portions interior to body 11 and at the portion extending beyond end 12. Shaft 16 is rotatably supported at both ends 12 and 13 by any of a number of conventional support means; a bearing-race assembly, denoted in general by numeral 16a, is suitable, but other arrangements may be used. Conventional belt pulley 17 is keyed to the extending end of the shaft at a suitable distance from body end 12 to prevent excess flexing of the shaft. Fan members, denoted in general by numerals 18a, 18b, and 18c, respectively, are keyed to shaft 16 interior to body 11. Each fan member, shown in detail in FIG. 5, includes a central support portion such as 19a on member 18a surrounding shaft 16 for attachment thereto. Blades such as 20a radiate from support 19a to outer support ring 19b within a short distance of body 11. Such blades are conventional fan or propeller type blades arranged to create a draft from left to right in FIG. 2. Such blades should be tough and durable. Although the fan member shown all have four blades apiece, three or more blades could be used for each of the members. The blades are fixed to the shaft at spaced intervals therealong; spacing depends upon blade design to achieve an effective draft. As body 11 tapers toward end 13, length must become shorter. Thus, blade member 18b has less radial extent than blade member 18a, and so forth, while maintaining generally the same distance from blade tip to body 11.

Between end brace member 22 and body end 13, in neck 15, screw auger 21 is mounted on shaft 16. Screw auger 21 may be slip-fitted or otherwise attached about shaft 16 to be non-rotating relative to the shaft. Screw auger 21 has relatively long pitch and extends radially close to the wall of neck 15. It is preferably framed from tough, hardened metal.

Brace member 22, FIG. 6, has central apertured portion 23 which allows shaft 17 to freely rotate therethrough. A plurality of support members 24a, 24b, 24c, and 24d, are fixed at one end of hub 23 and radiate therefrom and terminate at ring 25. The ring 25 is fixedly secured to body 11 as by welding.

Extruder plate 30 caps body end 13, FIG. 3. The plate may be secured to the end in any number of ways; welding or brazing is preferred. Extruder plate 30 has large central aperture 32 wherein the end of shaft 16 is supported and rotates. In extruder plate 30 radially from aperture 32 are a plurality of extrusion holes 31 through the plate.

In operation, the apparatus is attached to a lawnmower as shown in FIG. 1. Power is taken from the lawnmower engine by means of a fan belt around belt pulley 17 (FIG. 2) and a like pulley rotated by the motor. Rotation of the belt pulley revolves shaft 16, the fan members, and the screw auger. High speed rotation of the fan members causes a draft from inlet 14 and out extruder cap 30. Such a draft draws grass clippings cut by the mower into the body and the fan blades propel the clippings towards neck 15. Near the neck, the clippings encounter the influence of screw auger 21 and the screw motion carries the clippings towards extruder plate 30. The clippings are compacted together during their travel along the auger, and, upon reaching the extruder plate, are further compacted. The densely packed clippings are finally extruded through the holes in plate 30 as dense pellets due to the action of the auger. A plastic bag or the like, may be pushed along neck 15 so that as the pellets fill the bag, it unfurls. When only a short portion of the bag's mouth remains on the neck, the filled bag can be pulled from the neck, tied closed and disposed of without further transfer of the clippings. Using a bag with an elastic band around its mount, the bag may be automatically discharged and the elastic band tends to close the bag's opening.

I claim:

1. A grass-clippings pelletizer apparatus for attachment to a lawnmower comprising; a hollow tapering body of generally circular cross-section having a large closed end, an enlarged inlet adjacent said closed end, and an open small end smaller than said closed end; mounting means for mounting said body on a lawnmower; a rotatable shaft axially mounted in said body and having a portion extending substantially outside said body beyond said closed end; bearing means for supporting said shaft; means mounted on the extending portion of said shaft for rotatably driving said shaft by the lawnmower; at least one fan blade member mounted on said shaft in said body rotatable therewith for drawing grass clippings cut by the lawnmower into said inlet of said body and impelling the clippings towards said smaller end; a screw auger mounted axially on said shaft in said body adjacent said smaller end rotatable with said shaft for compacting the grass clippings and for moving the same towards said smaller end; an extruder plate having a plurality of apertures mounted on said smaller end whereby grass clippings induced into said body by said fan member will be forced through said extruder plate apertures by said screw auger to form extruded, dense pellets of grass.

2. A grass-clippings pelletizer apparatus according to claim 1 wherein said fan blade member includes four radially spaced blades.

3. A grass-clippings pelletizer according to claim 1 wherein three said fan blade members are spacedly mounted on said shaft.

4. A grass-clippings pelletizer according to claim 1 wherein said smaller end includes an elongated neck of generally uniform cross-section for securing a bag thereon for containing the extruded pellets.

5. A grass-clippings pelletizer according to claim 3 wherein said three fan blade members are of different lengths and extend from said shaft to near the tapering walls of said body.

6. A grass-clippings pelletizer according to claim 1 wherein said mounting means are adapted for mounting to a reel-type lawnmower.

* * * * *